(12) United States Patent
Li

(10) Patent No.: US 10,334,282 B2
(45) Date of Patent: Jun. 25, 2019

(54) METHODS AND DEVICES FOR LIVE BROADCASTING BASED ON LIVE BROADCASTING APPLICATION

(71) Applicant: Beijing Xiaomi Mobile Software Co., Ltd., Haidian District, Beijing (CN)

(72) Inventor: Zhigang Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/630,026

(22) Filed: Jun. 22, 2017

(65) Prior Publication Data

US 2018/0007394 A1 Jan. 4, 2018

(30) Foreign Application Priority Data

Jun. 30, 2016 (CN) .......................... 2016 1 0512582

(51) Int. Cl.
| | |
|---|---|
| *H04N 21/2187* | (2011.01) |
| *H04N 21/222* | (2011.01) |
| *H04N 21/4402* | (2011.01) |
| *H04N 21/647* | (2011.01) |
| *H04N 21/234* | (2011.01) |
| *H04N 21/258* | (2011.01) |
| *H04N 21/431* | (2011.01) |
| *H04N 21/44* | (2011.01) |
| *H04N 21/45* | (2011.01) |
| *H04N 21/475* | (2011.01) |

(52) U.S. Cl.
CPC ..... *H04N 21/2187* (2013.01); *H04N 21/2223* (2013.01); *H04N 21/234* (2013.01); *H04N 21/25891* (2013.01); *H04N 21/4312* (2013.01); *H04N 21/44* (2013.01); *H04N 21/4402* (2013.01); *H04N 21/4532* (2013.01); *H04N 21/475* (2013.01); *H04N 21/4753* (2013.01); *H04N 21/647* (2013.01)

(58) Field of Classification Search
CPC ........... H04N 21/2223; H04N 21/4402; H04N 21/647
USPC .................................................. 725/109, 112
See application file for complete search history.

(56) References Cited

U.S. PATENT DOCUMENTS

| | | | |
|---|---|---|---|
| 2015/0295726 A1 | 10/2015 | Bland | |
| 2016/0255078 A1* | 9/2016 | Zhang | ..................... H04L 63/18 |
| | | | 726/4 |

(Continued)

FOREIGN PATENT DOCUMENTS

CN         104954882 A     9/2015

OTHER PUBLICATIONS

Extended European Search Report in connection with corresponding EP Application No. 17172256, dated Nov. 2, 2017, 8 pages.

(Continued)

*Primary Examiner* — Pankaj Kumar
*Assistant Examiner* — Franklin S Andramuno
(74) *Attorney, Agent, or Firm* — Arch & Lake LLP

(57) ABSTRACT

Methods and devices are provided for live broadcasting in a live broadcasting field. The method includes: displaying a first button corresponding to public live broadcasting; obtaining a public account associated with a log-in account logging in to the live broadcasting application, when a trigger operation on the first button is detected; sending a live video streaming to respective audience sides corresponding to the public account.

20 Claims, 4 Drawing Sheets

(56) References Cited

U.S. PATENT DOCUMENTS

2016/0277802 A1* 9/2016 Bernstein ........... H04N 21/4788
2017/0289608 A1 10/2017 Li et al.

OTHER PUBLICATIONS

Daniel Howley: "How to keep your Facebook Live videos private", May 19, 2016, XP055418263, retrieved from the Internet: URL:https://finance.yahoo.com/news/facebook-live-video-private-205413060.html, p. 1, line 1-p. 2, line 10, 4 pages.
Vadim Lavrusik: "Expanding Live Video to More People | Facebook Newsroom", Jan. 28, 2016, XP055418580, retrieved from the Internet: URL:https://newsroom.fb.com/news/2016/01/expanding-live-video/, p. 1, line 1-p. 2, line 17, 4 pages.
Simo Fidji: "Introducing New Ways to Create, Share and Discover Live Video on Facebook | Facebook Newsroom", Apr. 6, 2016, XP055418200, retrieved from the Internet: URL:https://newsroom.fb.com/news/2016/04/introducing-new-ways-to-create-share-and-discover-live-video-on-facebook/, p. 2, line 1-p. 6, line 20, 8 pages.

* cited by examiner

METHODS AND DEVICES FOR LIVE BROADCASTING BASED ON LIVE BROADCASTING APPLICATION

CROSS-REFERENCE TO RELATED APPLICATION

The present application is based upon and claims priority to Chinese Patent Application No. 201610512582.0, filed on Jun. 30, 2016, the entirety contents of which are incorporated herein by reference.

TECHNICAL FIELD

The present disclosure relates to a live broadcasting field, and more particularly, to a live broadcasting method and device based on a live broadcasting application.

BACKGROUND

With the rapid development of network technologies, more and more live broadcasting applications have been created. Using the live broadcasting applications, an anchor can interact with the audience conveniently. For example, the anchor puts on a performance based on the live broadcasting application, and the audience give gifts based on the live broadcasting application. With the live broadcasting based on the live broadcasting application, the interactivity between the anchor and the audience is improved, and the interestingness of surfing the internet is increased. Among live broadcasting scenes, one important way is live broadcasting based on a public account, i.e., different anchors can log in to the live broadcasting application with the public account for live broadcasting. In addition, during a live broadcast based on the live broadcasting application, the anchor is required to log in to the live broadcasting application with an account.

In the related art, the anchor can make a live broadcasting using one account (based on the public account or the personal account) at a same time. That is, the live broadcasting is made based on the account with which the anchor logs in to the live broadcasting application, and the corresponding video streaming is sent to the audience side corresponding to the log-in account. If there is a need to make a live broadcasting using another account, the anchor has to perform an account switching, that is, the anchor needs to log out of the current account and input the account name and password of another account, such that the live video streaming is sent to the audience side corresponding to the other account after the live broadcasting application is logged in using the other account.

SUMMARY

In order to overcome the problem in the related art, the present disclosure provides a live broadcasting method and device based on a live broadcasting application.

According to a first aspect of the present disclosure, there is provided a live broadcasting method based on a live broadcasting application, including: displaying a first button corresponding to public live broadcasting; obtaining a public account associated with a log-in account logging in to the live broadcasting application, when a trigger operation on the first button is detected; and sending a live video streaming to respective audience sides corresponding to the public account.

According to a second aspect of the present disclosure, there is provided a live broadcasting device based on a live broadcasting application, including: a processor; a memory configured to store instructions executable by the processor; in which the processor is configured to: display a first button corresponding to public live broadcasting; obtain a public account associated with a log-in account logging in to the live broadcasting application, when a trigger operation on the first button is detected; and send a live video streaming to respective audience sides corresponding to the public account.

According to a third aspect of the present disclosure, there is provided a non-transitory computer-readable storage medium having stored therein instructions that, when executed by a processor of a terminal, causes the terminal to perform a live broadcasting method based on a live broadcasting application, the method comprising: displaying a first button corresponding to public live broadcasting; obtaining a public account associated with a log-in account logging in to the live broadcasting application, when a trigger operation on the first button is detected; and sending a live video streaming to respective audience sides corresponding to the public account.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Figure 1:
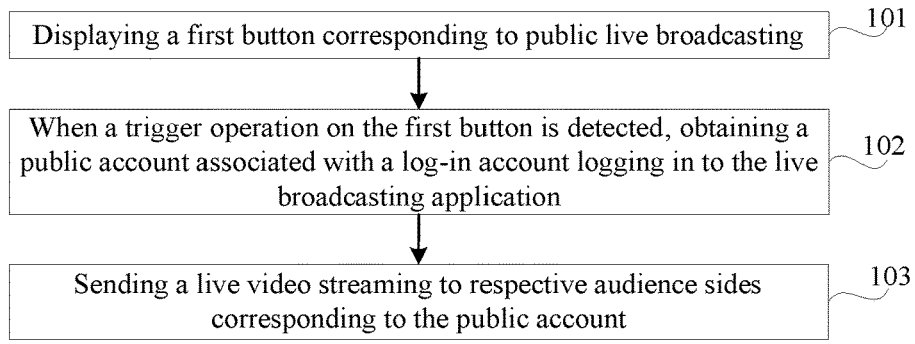
FIG. 1 is a flow chart illustrating a live broadcasting method based on a live broadcasting application according to an exemplary embodiment of the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

With the rapid development of network technologies, more and more live broadcasting applications have been created. An anchor can make a live broadcasting based on the live broadcasting application and interact with the audience based on the live broadcasting application. For example, the anchor puts on a performance, and the audiences comment and praise the performance of the anchor or give virtual gifts to the anchor. When the anchor makes a live broadcasting based on the live broadcasting application, he/she needs to log in to the live broadcasting application via an account first, and then make the live broadcasting based on the account.

The account logging in to the live broadcasting application may be a personal account of the anchor, or may also be a public account. For example, the personal account may be an account for an individual on a social network while the public account may be an account for the same individual or an organization on the social network. Here, the social network may be an online community that includes thousands of users and provide messaging services and streaming services among the users. The organization may be a company or other organizations that employ one or more individual anchors. The personal account of the anchor may be different from personal accounts of other anchors. The public account may be obtained by upgrading the personal account, or may also be obtained by applying to an account management center for a public account. Different anchors can log in to the live broadcasting application using the public account at different times and on a same device or different devices, and make the live broadcasting based on the public account.

The live broadcasting method based on the live broadcasting application is described in detail in following embodiments.

Based on the above description, FIG. 1 is a flow chart illustrating a live broadcasting method based on a live broadcasting application according to one or more exemplary embodiments of the present disclosure, in which the live broadcasting method based on a live broadcasting application is applied in a terminal. As shown in FIG. 1, the live broadcasting method based may include at least the following steps.

At step 101, a first button corresponding to public live broadcasting is displayed. For example, the terminal may display the first button corresponding to public live broadcasting on a display screen of the terminal. The terminal may be one of the following: a smart phone, a smart watch, a tablet, a laptop, or any other electronic device including a camera, a processor, and a display screen.

At step 102, when a trigger operation on the first button is detected, a public account associated with a log-in account logging in to the live broadcasting application is obtained. The terminal may obtain the public account when detecting a trigger operation on the first button, where the trigger operation may be customized by the anchor.

At step 103, live video streaming is sent to respective audience sides corresponding to the public account. The terminal may send the live video streaming to users who have subscribed to the streaming content of the public account.

The present disclosure provides a new method by obtaining the public account associated with the log-in account logging in to the live broadcasting application, and sending the live video streaming to respective audience sides corresponding to the public account. Thus, the live video streaming obtained by the personal account associated with the public account is sent to audience sides corresponding to the public account, such that the anchor can send the live video streaming to audience sides corresponding to other accounts without signing out of the log-in account. Therefore, the disclosed method ensures more convenient operation of sending live video streaming to different objects, and further increases user stickiness of the live broadcasting application.

Alternatively or additionally, displaying a first button corresponding to public live broadcasting includes:

displaying the first button corresponding to the public live broadcasting and a second button corresponding to personal live broadcasting;

after displaying the first button corresponding to the public live broadcasting and a second button corresponding to personal live broadcasting, the method further includes:

when a trigger operation on the second button is detected, sending the live video streaming to respective audience sides corresponding to a personal account, in which the personal account is the log-in account logging in to the live broadcasting application.

Alternatively or additionally, before displaying a first button corresponding to public live broadcasting, the method further includes:

determining whether there is a public account associated with the log-in account;

displaying a first button corresponding to public live broadcasting includes:

displaying the first button corresponding to the public live broadcasting if there is a public account associated with the log-in account.

Alternatively or additionally, displaying the first button corresponding to the public live broadcasting when there is a public account associated with the log-in account includes:

when there is a public account associated with the log-in account, displaying the first button corresponding to the public live broadcasting and identification information of the public account.

Alternatively or additionally, displaying the first button corresponding to the public live broadcasting when there is a public account associated with the log-in account includes:

when there are a plurality of public accounts associated with the log-in account, displaying buttons and identification information corresponding to the plurality of public accounts respectively.

Alternatively or additionally, the method further includes:

when a two-dimensional code of a public account is scanned by a camera, establishing an association relationship between the log-in account and the public account.

Alternatively or additionally, before sending the live video streaming to respective audience sides corresponding to the public account, the method further includes:

determining whether there is video streaming corresponding to the public account and sent by other accounts logging in to the live broadcasting application; and displaying a prompt message when there is video streaming corresponding to the public account and sent by other accounts logging in to the live broadcasting application.

All the above alternative technical solutions can be combined in any manner to form alternative embodiments of the present disclosure, which will not be elaborated herein.

Figure 2:
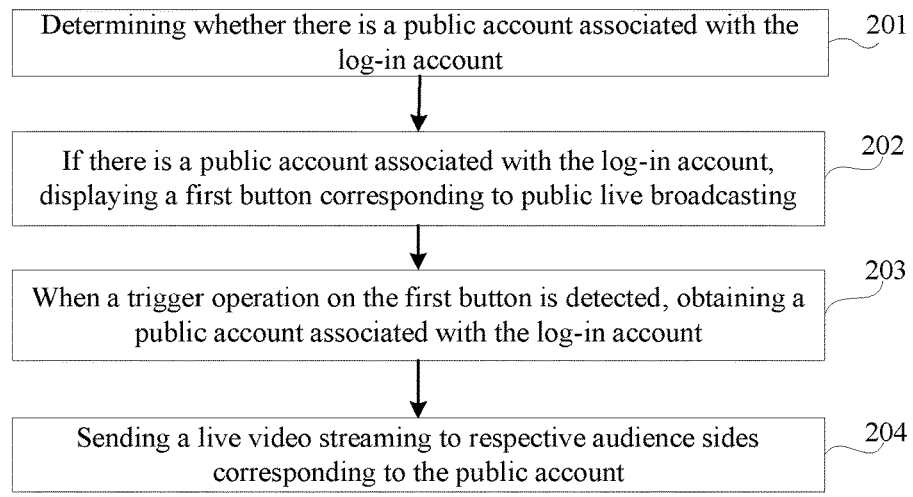
FIG. 2 is a flow chart illustrating a live broadcasting method based on a live broadcasting application according to an exemplary embodiment of the present disclosure.

Based on the description of the embodiment corresponding to FIG. 1, FIG. 2 is a flow chart illustrating a live broadcasting method based on a live broadcasting application according to one or more exemplary embodiment of the present disclosure, in which the live broadcasting method based on a live broadcasting application is applied in a terminal. As shown in FIG. 2, the live broadcasting method based on a live broadcasting application provided by an embodiment of the present disclosure includes following steps.

At step 201, it is determined whether there is a public account associated with the log-in account.

The log-in account is the account currently logging in to the live broadcasting application, and the log-in account may be a personal account.

In an embodiment of the present disclosure, when any personal account is associated with any public account, the personal account and the public account can be added into an association relationship table, such that the correspondence therebetween may be queried later. The association relationship table may be saved in a local database on the terminal. Alternatively or additionally, the association relationship table may be saved in a remote server. As shown in Table 1, an example association relationship table is given.

TABLE 1

| Public account | Personal account |
|---|---|
| Public account A | Personal account a |
| Public account A | Personal account b |
| . . . | . . . |
| Public account B | Personal account c |

It should be noted that, Table 1 is merely exemplary, and shall not be constructed to limit the present disclosure.

Based on this, when the log-in account is a personal account, it is possible to search the above association relationship table when determining whether there is a public account associated with the log-in account. When the log-in account exists in the association relationship table, it is determined that there is a public account associated with the log-in account. When the log-in account is not in the association relationship table, it is determined that there is no public account associated with the log-in account.

Establishing the association relationship between the log-in account and the public account includes but is not limited to, establishing the association relationship between the log-in account and the public account when it is detected that the two-dimensional code of the public account is scanned by a camera of the terminal where the log-in account is. In addition, it is possible to scan the two-dimensional code provided by the log-in account by a camera of the terminal where the public account is, such that the association relationship between the public account and the log-in account is established.

At step 202, when there is a public account associated with the log-in account, a first button corresponding to public live broadcasting is displayed.

The first button corresponding to public live broadcasting may be used to control an operation of switching to the public account for live broadcasting. By operating the first button, the live broadcasting can be performed based on the public account, or other contents can be generated on the page and the live broadcasting based on the public account can be realized based on the other contents. That is, the first button corresponding to public live broadcasting may be related to the public account associated with the log-in account, or may not be related to the public account associated with the log-in account.

Alternatively or additionally, besides the first button corresponding to public live broadcasting, identification information of the public account may be further displayed when displaying the first button corresponding to public live broadcasting. The identification information may be a name of the public account. For example, the identification information may indicate that the public account corresponds to program A. By displaying the identification information of the public account, the audience can intuitively know the broadcasting content available from the live broadcasting of the public account. For example, the identification information may be displayed on the first button.

Further, One log-in account may be associated with a plurality of public accounts. When the log-in account is associated with a plurality of public accounts and the first button is associated with the public accounts associated with the log-in account, buttons and identification information respectively corresponding to the plurality of public accounts may be displayed when the first button corresponding to public live broadcasting is displayed. When displaying the buttons and identification information respectively corresponding to the plurality of public accounts, the buttons and identification information respectively corresponding to the plurality of public accounts may be directly displayed side-by-side, or the buttons and identification information respectively corresponding to the plurality of public accounts may be displayed after a specified operation on the first button is detected. That is, after the specified operation on the first button is detected, the buttons and identification information respectively corresponding to the plurality of public accounts may be displayed in a form of a pull-down menu or a popup dialog box. The specified operation may be a single-clicking operation, a double-clicking operation, or a long-pressing operation.

At step 203, when a trigger operation on the first button is detected, the public account associated with the log-in account is obtained.

The trigger operation on the first button may be single-clicking operation, a double-clicking operation, or an operation of drawing a specified shape, performed on the first button.

For example, based on the example association relationship table shown in step 201, after the public account associated with the log-in account is obtained, it is possible to search the association relationship table, and use the public account corresponding to the log-in account in the association relationship table as the public account associated with the log-in account.

At step 204, live video streaming is sent to respective audience sides corresponding to the public account.

The live video streaming may include live broadcasting screen data and the audio streaming data collected by the camera and the microphone. The audience sides corresponding to the public account may be clients of the audience subscribed to the public account.

For example, in order to increase the transmission speed when the live video streaming is sent to respective audience sides corresponding to the public account, it is possible to compress the live video streaming using a preset compression algorithm first, and then the compressed live video streaming is sent to respective audience sides corresponding to the public account. With respect to the preset compression algorithm, it is not limited in the present disclosure.

Alternatively or additionally, multiple anchors can use the same public account to make a live broadcasting, but they cannot make the live broadcasting using the same public account at a same time. Thus, before the live video streaming is sent to respective audience sides corresponding to the public account, it may be determined whether there is video streaming corresponding to the public account and sent by other accounts logging in to the live broadcasting application, that is, it is determined whether there is other log-in account sending video streaming to the audience sides corresponding to the public account. When it is determined that there is video streaming corresponding to the public account and sent by other accounts logging in to the live broadcasting application, it is determined that the audience sides corresponding to the public account are busy now, and in this case, a prompt message may be displayed, for prompting that it fails to send the video streaming or the public account is busy now.

Alternatively or additionally, at step 202, besides the first button corresponding to public live broadcasting, a second button corresponding to personal live broadcasting may be further displayed. Based on this, the live video streaming can be sent to respective audience sides corresponding to the personal account, and the live video streaming can also be sent to respective audience sides corresponding to the public account. Alternatively, when a trigger operation on the second button is detected, the live video streaming is sent to respective audience sides corresponding to the personal account, and in this case, the anchor interacts with the audience subscribed to the personal account. When the trigger operation on the first button is further detected based on this, the live video streaming is sent to respective audience sides corresponding to the public account, and in this case, the anchor interacts with the audience subscribed to the public account. The trigger operation may be a clicking operation or a long-pressing operation, which may be customized by the anchor on the terminal.

Further, the interaction between the anchor and the audience subscribed to the personal account may be realized in a broadcasting room corresponding to the personal account. The interaction may include replying to the praise, comments, requirement or gifts given by the audience subscribed to the personal account. When the interaction with the audience subscribed to the personal account is performed in the broadcasting room corresponding to the personal account, the audience subscribed to the personal account can receive interaction messages, and the audience subscribed to the public account cannot receive interaction messages. The interaction between the anchor and the audience subscribed to the public account may be realized in a broadcasting room corresponding to the public account. The interaction may include replying to the praise, comments, requirement or gifts given by the audience subscribed to the public account. When the interaction with the audience subscribed to the public account is performed in the broadcasting room corresponding to the public account, the audience subscribed to the public account can receive interaction messages, and the audience subscribed to the personal account cannot receive interaction messages.

By disposing and displaying the first button and the second button, the terminal enables the anchor to switch between the personal account and the public account simply. Thus, the switch operation is more convenient, which further facilitates interaction with different audience sides.

With the method provided by embodiments of the present disclosure, by obtaining the public account associated with the log-in account logging in to the live broadcasting application, and sending the live video streaming to respective audience sides corresponding to the public account, a method in which the live video streaming obtained by the personal account associated with the public account is sent to audience sides corresponding to the public account is provided, such that the anchor can send the live video streaming to audience sides corresponding to other accounts without signing out of the log-in account, thereby ensuring more convenient operation of sending live video streaming to different objects, and further increasing user stickiness of the live broadcasting application.

Figure 3A:
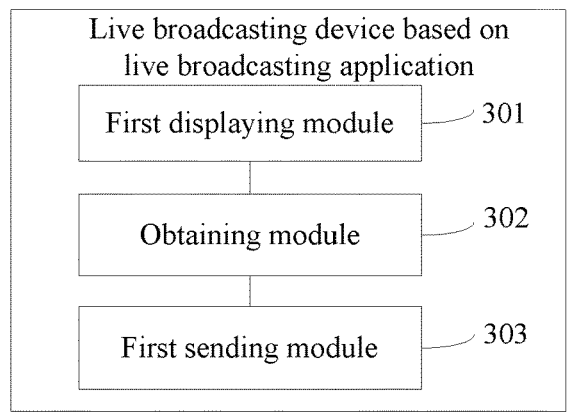
FIG. 3A is a block diagram illustrating a live broadcasting device based on a live broadcasting application according to an exemplary embodiment of the present disclosure.

FIG. 3A is a block diagram illustrating a live broadcasting device based on a live broadcasting application according to one or more exemplary embodiments of the present disclosure. As shown in FIG. 3A, the live broadcasting device based on a live broadcasting application includes a first displaying module 301, an obtaining module 302 and a first sending module 303.

The first displaying module 301 is configured to display a first button corresponding to public live broadcasting.

The obtaining module 302 is configured to obtain a public account associated with a log-in account logging in to the live broadcasting application, when a trigger operation on the first button is detected.

The first sending module 303 is configured to send a live video streaming to respective audience sides corresponding to the public account.

Alternatively or additionally, the first displaying module 301 is configured to display the first button corresponding to the public live broadcasting and a second button corresponding to personal live broadcasting.

Figure 3B:
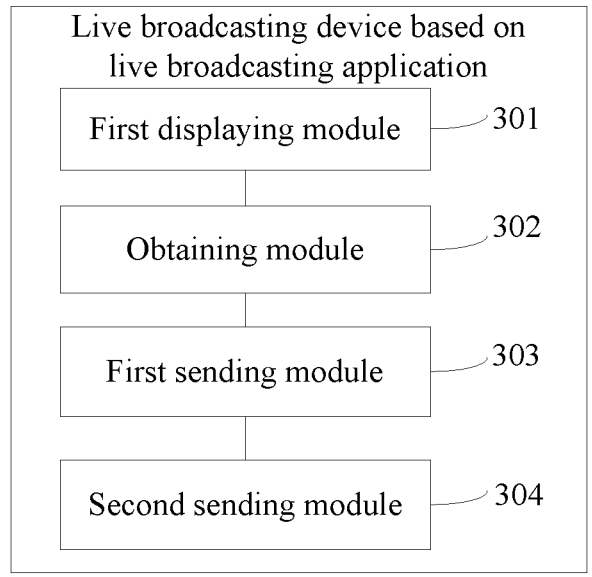
FIG. 3B is a block diagram illustrating a live broadcasting device based on a live broadcasting application according to an exemplary embodiment of the present disclosure.

As shown in FIG. 3B, the device further includes a second sending module 304.

The second sending module 304 is configured to send the live video streaming to respective audience sides corresponding to a personal account when a trigger operation on the second button is detected, in which the personal account is the log-in account logging in to the live broadcasting application.

Figure 3C:
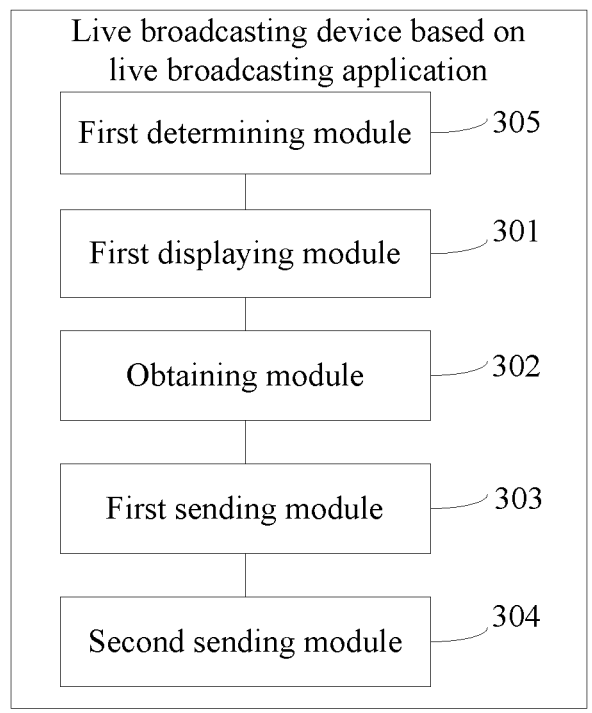
FIG. 3C is a block diagram illustrating a live broadcasting device based on a live broadcasting application according to an exemplary embodiment of the present disclosure.

Alternatively or additionally, as shown in FIG. 3C, the device further includes a first determining module 305.

The first determining module 305 is configured to determine whether there is a public account associated with the log-in account.

The first displaying module 301 is configured to display the first button corresponding to the public live broadcasting when there is a public account associated with the log-in account.

Alternatively or additionally, the first displaying module 301 is configured to display the first button corresponding to the public live broadcasting and identification information of the public account, when there is a public account associated with the log-in account.

Alternatively or additionally, the first displaying module 301 is configured to display buttons and identification information corresponding to a plurality of public accounts respectively, when there are the plurality of public accounts associated with the log-in account.

Figure 3D:
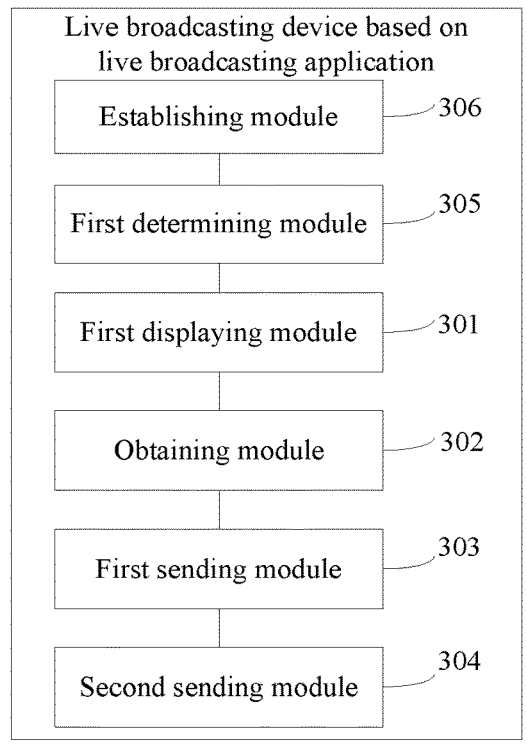
FIG. 3D is a block diagram illustrating a live broadcasting device based on a live broadcasting application according to an exemplary embodiment of the present disclosure.

Alternatively or additionally, as shown in FIG. 3D, the device further includes an establishing module 306.

The establishing module 306 is configured to establish an association relationship between the log-in account and a public account when a two-dimensional code of the public account is scanned by a camera.

Figure 3E:
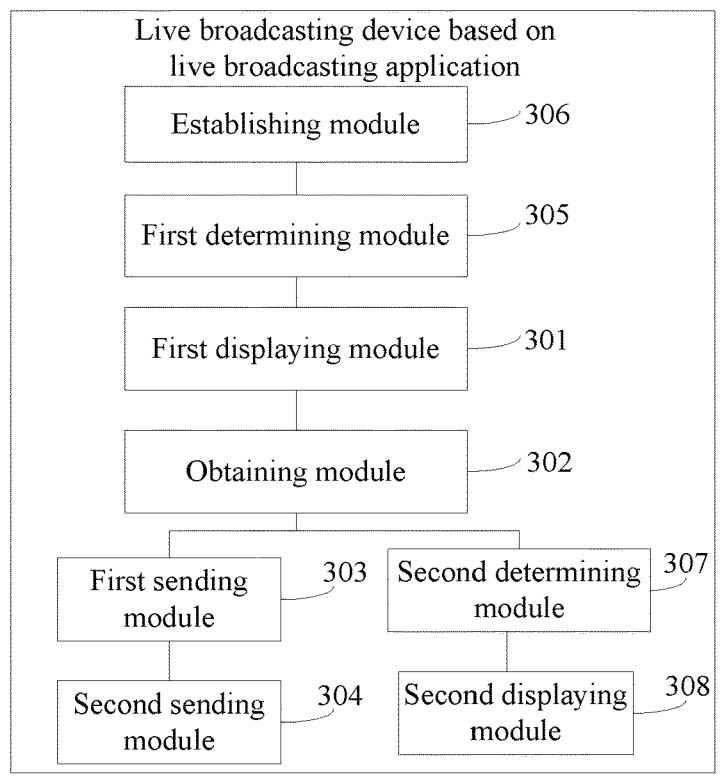
FIG. 3E is a block diagram illustrating a live broadcasting device based on a live broadcasting application according to an exemplary embodiment of the present disclosure.

Alternatively or additionally, as shown in FIG. 3E, the device further includes a second determining module 307 and a second displaying module 308.

The second determining module 307 is configured to determine whether there is video streaming corresponding to the public account and sent by other accounts logging in to the live broadcasting application.

The second displaying module 308 is configured to display a prompt message when there is video streaming corresponding to the public account and sent by other accounts logging in to the live broadcasting application.

With respect to the devices in above embodiments, the specific operation manners for individual modules therein refer to those described in detail in the embodiments regarding the methods, which are not elaborated herein again.

All the above alternative technical solutions can be combined in any manner to form alternative embodiments of the present disclosure, which will not be elaborated herein.

With the device provided by embodiments of the present disclosure, by obtaining the public account associated with the log-in account logging in to the live broadcasting application, and sending the live video streaming to respective audience sides corresponding to the public account, a method in which the live video streaming obtained by the personal account associated with the public account is sent to audience sides corresponding to the public account is provided, such that the anchor can send the live video streaming to audience sides corresponding to other accounts without signing out of the log-in account, thereby ensuring more convenient operation of sending live video streaming to different objects, and further increasing user stickiness of the live broadcasting application.

Figure 4:
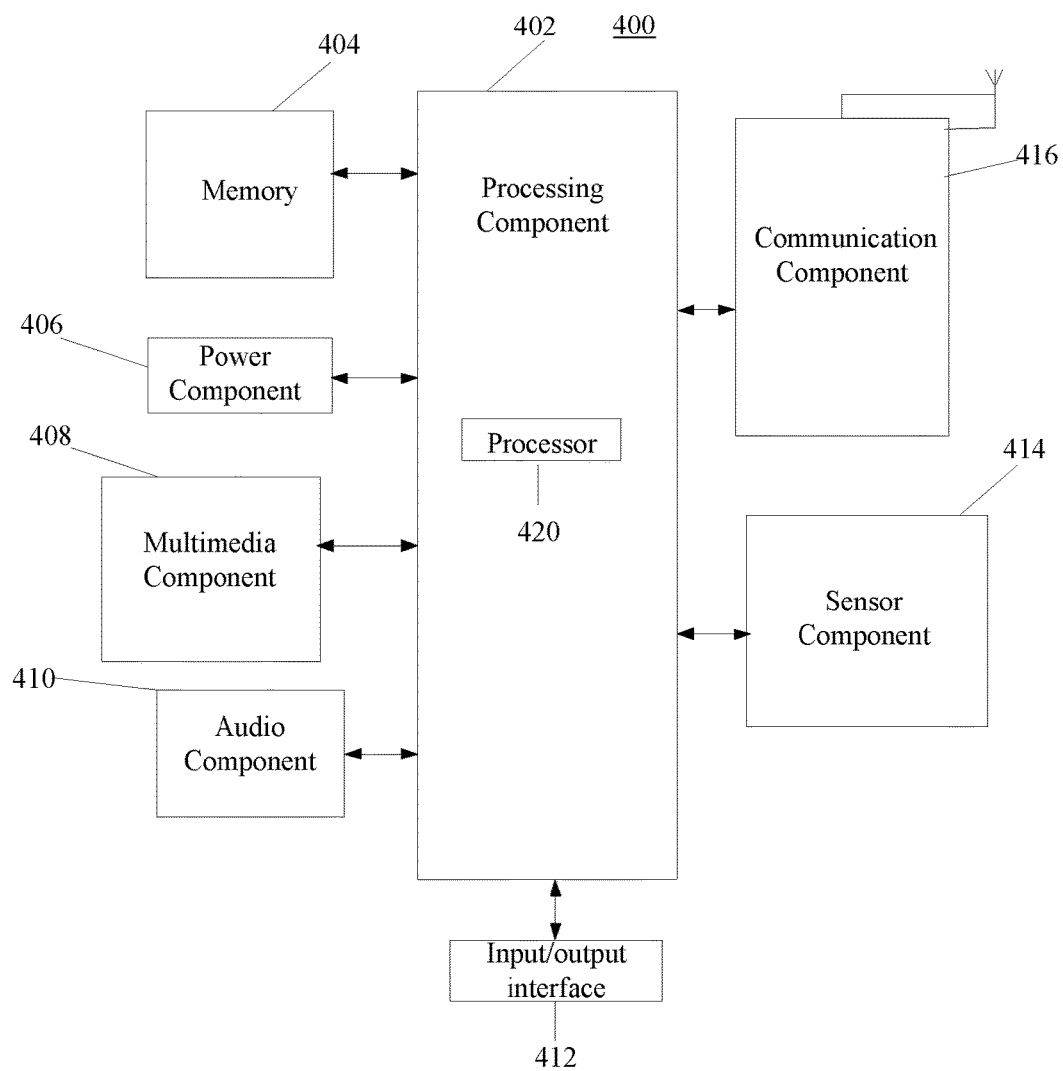
FIG. 4 is a block diagram illustrating a device according to an exemplary embodiment of the present disclosure.

FIG. 4 is a block diagram of a device 400 for live broadcasting based on a live broadcasting application according to one or more exemplary embodiments of the present disclosure. For example, the device 400 may be a terminal such as a mobile phone, a computer, a digital broadcast terminal, a messaging device, a gaming console, a tablet, a medical device, an exercise equipment, a personal digital assistant, or the like.

Referring to FIG. 4, the device 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the device 400, such as the operations associated with display, telephone calls, data communications, camera operations, and recording operations. The processing component 402 may include one or more processors 420 to execute instructions to perform all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the device 400. Examples of such data include instructions for any applications or methods operated on the device 400, contact data, phonebook data, messages, pictures, video, etc. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the device 400. The power component 406 may include a power management system, one or more power sources, and any other components associated with the generation, management, and distribution of power in the device 400.

The multimedia component 408 includes a screen providing an output interface between the device 400 and the user. In some embodiments, the screen may include a liquid crystal display (LCD) and a touch panel (TP). When the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 408 includes a front camera and/or a rear camera. The front camera and the rear camera may receive an external multimedia datum while the device 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone (MIC) configured to receive an external audio signal when the device 400 is in an operation mode, such as a call mode, a recording mode, and a voice recognition mode. The received audio signal may be further stored in the memory 404 or transmitted via the communication component 416. In some embodiments, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the device 400. For instance, the sensor component 414 may detect an open/closed status of the device 400, relative positioning of components, e.g., the display and the keypad, of the device 400, a change in position of the device 400 or a component of the device 400, a presence or absence of user contact with the device 400, an orientation or an acceleration/deceleration of the device 400, and a change in temperature of the device 400. The sensor component 414 may include a proximity sensor configured to detect the presence of nearby objects without any physical contact. The sensor component 414 may also include a light sensor, such as a CMOS or CCD image sensor, for use in imaging applications. In some embodiments, the sensor component 414 may also include an accelerometer sensor, a gyroscope sensor, a magnetic sensor, a pressure sensor, or a temperature sensor.

The communication component 416 is configured to facilitate communication, wired or wirelessly, between the device 400 and other devices. The device 400 can access a wireless network based on a communication standard, such as WiFi, 2G or 3G or a combination thereof. In one exemplary embodiment, the communication component 416 receives a broadcast signal or broadcast associated information from an external broadcast management system via a broadcast channel. In one exemplary embodiment, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 400 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The device 400 may use the circuitries in combination with the other hardware or software components for performing the above described methods. Each module, sub-module, unit, or sub-unit disclosed above may be implemented at least partially using the one or more circuitries.

In exemplary embodiments, there is also provided a non-transitory computer-readable storage medium including instructions, such as the memory 404 including instructions, the above instructions are executable by the processor 420 in the device 400, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium is provided. Instructions in the storage medium, when executed by a processor of a terminal, cause the mobile terminal to perform a live broadcasting method based on a live broadcasting application, the method including:

displaying a first button corresponding to public live broadcasting;

obtaining a public account associated with a log-in account logging in to the live broadcasting application, when a trigger operation on the first button is detected; and sending a live video streaming to respective audience sides corresponding to the public account.

Alternatively or additionally, displaying a first button corresponding to public live broadcasting includes: displaying the first button corresponding to the public live broadcasting and a second button corresponding to personal live broadcasting. After displaying the first button corresponding to the public live broadcasting and a second button corresponding to personal live broadcasting, the method further includes: when a trigger operation on the second button is detected, sending the live video streaming to respective audience sides corresponding to a personal account, in which the personal account is the log-in account logging in to the live broadcasting application.

Alternatively or additionally, before displaying a first button corresponding to public live broadcasting, the method further includes: determining whether there is a public account associated with the log-in account. Here, displaying a first button corresponding to public live broadcasting may include: displaying the first button corresponding to the public live broadcasting when there is a public account associated with the log-in account.

Alternatively or additionally, displaying the first button corresponding to the public live broadcasting when there is a public account associated with the log-in account includes: when there is a public account associated with the log-in account, displaying the first button corresponding to the public live broadcasting and identification information of the public account.

Alternatively or additionally, displaying the first button corresponding to the public live broadcasting when there is a public account associated with the log-in account includes: when there are a plurality of public accounts associated with the log-in account, displaying buttons and identification information corresponding to the plurality of public accounts respectively.

Alternatively or additionally, the method further includes: when a two-dimensional code of a public account is scanned by a camera, establishing an association relationship between the log-in account and the public account.

Alternatively or additionally, before sending the live video streaming to respective audience sides corresponding to the public account, the method further includes: determining whether there is video streaming corresponding to the public account and sent by other accounts logging in to the live broadcasting application; and displaying a prompt message when there is video streaming corresponding to the public account and sent by other accounts logging in to the live broadcasting application.

With the device provided by embodiments of the present disclosure, by obtaining the public account associated with the log-in account logging in to the live broadcasting application, and sending the live video streaming to respective audience sides corresponding to the public account, a method in which the live video streaming obtained by the personal account associated with the public account is sent to audience sides corresponding to the public account is provided, such that the anchor can send the live video streaming to audience sides corresponding to other accounts without signing out of the log-in account, thereby ensuring more convenient operation of sending live video streaming to different objects, and further increasing user stickiness of the live broadcasting application.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A live broadcasting method on a social network based on a live broadcasting application, comprising:
    managing log-in accounts including:
        a personal account for an individual on the social network, and
        a public account for an organization on the social network;
    adding the personal account and the public account into an association relationship table, when any personal account is associated with any public account, such that the correspondence therebetween may be queried later;
    displaying a first button corresponding to public live broadcasting;
    obtaining a public account associated with a log-in account logging in to the live broadcasting application, when a trigger operation on the first button is detected, wherein the log-in account is the account currently logging in to the live broadcasting application, and the log-in account is a personal account; and
    sending a live video streaming to respective audience sides corresponding to the public account,
    wherein the first button is configured to control an operation of switching from the personal account to the public account for live broadcasting, and different users log in to the live broadcasting application using the public account at different times and on a same device or different devices.

2. The method according to claim 1, wherein displaying a first button corresponding to public live broadcasting comprises:
    displaying the first button corresponding to the public live broadcasting and a second button corresponding to personal live broadcasting;
    after displaying the first button corresponding to the public live broadcasting and a second button corresponding to personal live broadcasting, the method further comprises:
    when a trigger operation on the second button is detected, sending the live video streaming to respective audience sides corresponding to the personal account, in which the personal account is the log-in account logging in to the live broadcasting application.

3. The method according to claim 1, wherein,
    the method further comprises: determining whether there is a public account associated with the log-in account;
    displaying a first button corresponding to public live broadcasting comprises: displaying the first button corresponding to the public live broadcasting if there is a public account associated with the log-in account.

4. The method according to claim 3, wherein, displaying the first button corresponding to the public live broadcasting if there is a public account associated with the log-in account comprises:
    if there is a public account associated with the log-in account, displaying the first button corresponding to the public live broadcasting and identification information of the public account.

5. The method according to claim 3, wherein, displaying the first button corresponding to the public live broadcasting if there is a public account associated with the log-in account comprises:
    if there are a plurality of public accounts associated with the log-in account, displaying buttons and identification information corresponding to the plurality of public accounts respectively.

6. The method according to claim 3, further comprising:
    when a two-dimensional code of a public account is scanned by a camera, establishing an association relationship between the log-in account and the public account.

7. The method according to claim 1, further comprising:
    determining whether there is video streaming corresponding to the public account and sent by other accounts logging in to the live broadcasting application; and
    displaying a prompt message if there is video streaming corresponding to the public account and sent by other accounts logging in to the live broadcasting application.

8. A live broadcasting device based on a live broadcasting application on a social network, comprising:
    a processor;
    a memory, configured to store instructions executable by the processor,
    wherein the processor is configured to:
    managing log-in accounts including:
        a personal account for an individual on the social network, and
        a public account for an organization on the social network;
    adding the personal account and the public account into an association relationship table, when any personal account is associated with any public account, such that the correspondence therebetween may be queried later;
    display a first button corresponding to public live broadcasting;
    obtain a public account associated with a log-in account logging in to the live broadcasting application, when a trigger operation on the first button is detected, wherein the log-in account is the account currently logging in to the live broadcasting application, and the log-in account is a personal account; and send a live video streaming to respective audience sides corresponding to the public account, wherein the first button is configured to control an operation of switching to the public account for live broadcasting, and different users log in to the live broadcasting application using the public account at different times and on a same device or different devices.

9. The device according to claim 8, wherein
the processor is configured to display a first button corresponding to public live broadcasting by displaying the first button corresponding to the public live broadcasting and a second button corresponding to personal live broadcasting;

and, the processor is further configured to:
when a trigger operation on the second button is detected, send the live video streaming to respective audience sides corresponding to the personal account, in which the personal account is the log-in account logging in to the live broadcasting application.

10. The device according to claim 8, wherein,
the processor is further configured to determine whether there is a public account associated with the log-in account;

and the processor is configured to display the first button corresponding to the public live broadcasting if there is a public account associated with the log-in account.

11. The device according to claim 10, wherein, the processor is configured to display the first button corresponding to the public live broadcasting if there is a public account associated with the log-in account by an act of:
if there is a public account associated with the log-in account, displaying the first button corresponding to the public live broadcasting and identification information of the public account.

12. The device according to claim 10, wherein, the processor is configured to display the first button corresponding to the public live broadcasting if there is a public account associated with the log-in account by an act of:
if there are a plurality of public accounts associated with the log-in account, displaying buttons and identification information corresponding to the plurality of public accounts respectively.

13. The device according to claim 10, wherein, the processor is further configured to:
when a two-dimensional code of a public account is scanned by a camera, establish an association relationship between the log-in account and the public account.

14. The device according to claim 8, wherein, the processor is further configured to:
determine whether there is video streaming corresponding to the public account and sent by other accounts logging in to the live broadcasting application; and
display a prompt message if there is video streaming corresponding to the public account and sent by other accounts logging in to the live broadcasting application.

15. A non-transitory computer-readable storage medium having stored therein instructions that, when executed by a processor of a terminal, causes the terminal to perform a live broadcasting method on a social network based on a live broadcasting application, the method comprising:

managing log-in accounts including:
a personal account for an individual on the social network, and
a public account for an organization on the social network;

adding the personal account and the public account into an association relationship table, when any personal account is associated with any public account, such that the correspondence therebetween may be queried later;

displaying a first button corresponding to public live broadcasting;

obtaining a public account associated with a log-in account logging in to the live broadcasting application, when a trigger operation on the first button is detected, wherein the log-in account is the account currently logging in to the live broadcasting application, and the log-in account is a personal account; and sending a live video streaming to respective audience sides corresponding to the public account, wherein the first button is configured to control an operation of switching to the public account for live broadcasting, and different users log in to the live broadcasting application using the public account at different times and on a same device or different devices.

16. The non-transitory computer-readable storage medium according to claim 15, wherein displaying a first button corresponding to public live broadcasting comprises:
displaying the first button corresponding to the public live broadcasting and a second button corresponding to personal live broadcasting;

after displaying the first button corresponding to the public live broadcasting and a second button corresponding to personal live broadcasting, the method further comprises:
when a trigger operation on the second button is detected, sending the live video streaming to respective audience sides corresponding to the personal account, in which the personal account is the log-in account logging in to the live broadcasting application.

17. The non-transitory computer-readable storage medium according to claim 15, wherein,
the method further comprises: determining whether there is a public account associated with the log-in account;
displaying a first button corresponding to public live broadcasting comprises:
displaying the first button corresponding to the public live broadcasting if there is a public account associated with the log-in account.

18. The non-transitory computer-readable storage medium according to claim 17, wherein, displaying the first button corresponding to the public live broadcasting if there is a public account associated with the log-in account comprises:
if there is a public account associated with the log-in account, displaying the first button corresponding to the public live broadcasting and identification information of the public account.

19. The non-transitory computer-readable storage medium according to claim 17, wherein, displaying the first button corresponding to the public live broadcasting if there is a public account associated with the log-in account comprises:
if there are a plurality of public accounts associated with the log-in account, displaying buttons and identification information corresponding to the plurality of public accounts respectively.

20. The non-transitory computer-readable storage medium according to claim 17, wherein the method further comprises:

when a two-dimensional code of a public account is scanned by a camera, establishing an association relationship between the log-in account and the public account.

* * * * *